United States Patent [19]
Betts et al.

[11] Patent Number: 5,859,877
[45] Date of Patent: *Jan. 12, 1999

[54] SIMULTANEOUS ANALOG AND DIGITAL COMMUNICATION USING FRACTIONAL RATE ENCODING

[75] Inventors: William Lewis Betts, St. Petersburg; Gordon Bremer, Clearwater, both of Fla.

[73] Assignee: Paradyne Corporation, Largo, Fla.

[ * ] Notice: The term of this patent shall not extend beyond the expiration date of Pat. No. 5,684,834.

[21] Appl. No.: 922,088

[22] Filed: Sep. 2, 1997

Related U.S. Application Data

[63] Continuation of Ser. No. 76,517, Jun. 14, 1993, Pat. No. 5,684,834.

[51] Int. Cl.$^6$ ................................................. H04L 27/04
[52] U.S. Cl. .......................... 375/298; 375/261; 375/308; 332/103
[58] Field of Search .................................... 375/216, 260, 375/261, 262, 265, 281, 295, 298, 308; 332/103

[56] References Cited

U.S. PATENT DOCUMENTS

| | | | |
|---|---|---|---|
| 4,512,013 | 4/1985 | Nash et al. | 370/215 |
| 4,546,212 | 10/1985 | Crowder | 370/488 |
| 4,630,287 | 12/1986 | Armstrong | 375/261 |
| 4,651,320 | 3/1987 | Thapar | 370/207 |
| 4,672,602 | 6/1987 | Hargrave et al. | 370/360 |
| 4,757,495 | 7/1988 | Decker et al. | 370/477 |
| 4,891,806 | 1/1990 | Farias et al. | 370/503 |
| 4,924,516 | 5/1990 | Bremer et al. | 380/46 |
| 5,081,647 | 1/1992 | Bremer | 375/216 |
| 5,103,227 | 4/1992 | Betts et al. | 341/61 |
| 5,115,453 | 5/1992 | Calderbank et al. | 375/265 |
| 5,162,812 | 11/1992 | Aman et al. | 375/265 |
| 5,214,656 | 5/1993 | Chung et al. | 371/37.7 |

(List continued on next page.)

FOREIGN PATENT DOCUMENTS

| | | | |
|---|---|---|---|
| 0552034 A2 | 7/1993 | European Pat. Off. | H04L 5/02 |
| WO 92/17971 | 10/1992 | WIPO | H04L 27/34 |

OTHER PUBLICATIONS

"Adaptive Equalization and Phase Tracking for Simultaneous Analog/Digital Data Transmission" by Lim et al, The Bell System Technical Journal, vol. 60, No. 9, Nov. 1981 pp. 2039–2063.

"High–Speed Digital and Analog parallel Transmission Technique Over Telephone Channel" by Akashi, et al, IEE Transactions on Communications, vol. Com–30, No. 5, May 15, 1982, pp. 1213–1218.

"Simultaneous Transmission of Speech and Data Using Code–breaking Techniques," by Steele et al, The Bell System Journal, vol. 60, No. 9, Nov. 1981, pp. 2081–2105.

"Adaptive Noise Cancelling Principles and Applications," by Widrow et al, Proceedings of the IEE, vol. 63, No. 12, Dec. 1975.

"An Integrated Digital Subscribers Speech and Data Service" by Stagg et al, ICC '80 Conf. Rec., vol. 3, Seattle, Washington; Jun. 8–12, 1980 pp. 39.b.1–39.6.6.

(List continued on next page.)

Primary Examiner—Young T. Tse
Attorney, Agent, or Firm—Thomas, Kayden, Horstemeyer & Risley, L.L.P.

[57] ABSTRACT

Digital data is encoded using a modulus m converter to produce fractionally encoded words, where m is the nearest integer larger than $2^c$ and c is a noninteger. The fractionally encoded words are mapped into a symbol constellation having m symbols to produce a two dimensional data signal. The data signal is added to a two dimensional analog signal, which was obtained by encoding an input analog signal, to produce a combined two dimensional signal. The combined signal is modulated using QAM and then transmitted over a communication channel.

15 Claims, 11 Drawing Sheets

U.S. PATENT DOCUMENTS

| | | | |
|---|---|---|---|
| 5,243,627 | 9/1993 | Betts et al. | 375/222 |
| 5,251,236 | 10/1993 | Bremer et al. | 375/298 |
| 5,280,503 | 1/1994 | Betts et al. | 375/377 |
| 5,305,352 | 4/1994 | Calderbank et al. | 375/261 |
| 5,377,194 | 12/1994 | Calderbank et al. | 370/524 |
| 5,475,713 | 12/1995 | Bremer et al. | 375/216 |
| 5,521,942 | 5/1996 | Betts et al. | 375/295 |
| 5,559,791 | 9/1996 | Bremer et al. | 370/207 |

OTHER PUBLICATIONS

"Frequency Domain Data Transmission Using Reduced Computational Complexity Algorithms," by Peled et al, ICASSP 80 Proc. Denver, Colo., vol. 1, Apr. 9–11, 1980, pp. 964–967.

"Speech and Data Transmission in ACS Telephone Channels" by Bukhviner, V.E., Telecomm. & Radio Eng., vol. 30/31; Jul. 1976, pp. 111–113.

"Speech–band data modems" by Adams, P.F., Electronics and Power, vol. 26, No. 9; Sep. 1980, pp. 733–736.

"Method for Superimposing Data on Amplitude–Modulated Signals" by Lockhart, G.B., Electronics Letters, Apr. 29, 1982, vol. 18, No. 9, pp. 379–381.

"A New Generation of Speech Plus Data Multiplexer" by Shum et al, Conf. on Communications and Equipment and Systems, Birmingham, England, Apr. 4–7, 1978, pp. 111–113.

FRACTIONAL BIT CODING
BITS/SYMBOL AND MODULUS (NUMBER OF SIGNAL POINTS)

| DATA RATE | SYMBOL RATE | | | | | | | | | | |
|---|---|---|---|---|---|---|---|---|---|---|---|
| | 2400 | | 2743 | | 2800 | | 2880 | | 3086 | | 3200 |
| 24000 | 10 | 1024 | $\frac{35}{4}$ | 431 | $\frac{60}{7}$ | 381 | $\frac{25}{3}$ | 323 | $\frac{70}{9}$ | 220 | $\frac{15}{2}$ | 182 |
| 21600 | 9 | 512 | $\frac{63}{8}$ | 235 | $\frac{54}{7}$ | 211 | $\frac{15}{2}$ | 182 | 7 | 128 | $\frac{27}{4}$ | 108 |
| 19200 | 8 | 256 | 7 | 128 | $\frac{48}{7}$ | 116 | $\frac{20}{3}$ | 102 | $\frac{56}{9}$ | 75 | 6 | 64 |
| 16800 | 7 | 128 | $\frac{49}{8}$ | 70 | 6 | 64 | $\frac{35}{6}$ | 58 | $\frac{49}{9}$ | 44 | $\frac{21}{4}$ | 39 |
| 14400 | 6 | 64 | $\frac{21}{4}$ | 39 | $\frac{36}{7}$ | 36 | 5 | 32 | $\frac{14}{3}$ | 26 | $\frac{9}{2}$ | 23 |
| 12000 | 5 | 32 | $\frac{35}{8}$ | 21 | $\frac{30}{7}$ | 20 | $\frac{25}{6}$ | 18 | $\frac{35}{9}$ | 15 | $\frac{15}{4}$ | 14 |
| 9600 | 4 | 16 | $\frac{7}{2}$ | 12 | $\frac{24}{7}$ | 11 | $\frac{10}{3}$ | 11 | $\frac{28}{9}$ | 9 | 3 | 8 |
| 7200 | 3 | 8 | $\frac{21}{8}$ | 7 | $\frac{18}{7}$ | 6 | $\frac{5}{2}$ | 6 | $\frac{7}{3}$ | 6 | $\frac{9}{4}$ | 5 |

*FIG. 15*

| DATA RATE | 2400 | 2743-8 | 2800-7 | 2880-6 | 3086-9 | 3200-4 |
|---|---|---|---|---|---|---|
| 24000 | 10 | 9998999998 | 9898989 | 9889988 | 888887888887 | 8787 |
| 21600 | 9 | 8888888887 | 8887887 | 8787787 | 777777777777 | 7776 |
| 19200 | 8 | 7777777777 | 7777776 | 7776776 | 766667666666 | 6666 |
| 16800 | 7 | 7666666666 | 6666666 | 6666665 | 656565656655 | 6555 |
| 14400 | 6 | 6555565555 | 6555555 | 5555555 | 555455545554 | 5454 |
| 12000 | 5 | 5444544454 | 5445444 | 5444444 | 444444444443 | 4443 |
| 9600 | 4 | 4343434343 | 4343433 | 4334433 | 433333333333 | 3333 |
| 7200 | 3 | 3323232323 | 3232323 | 3232232 | 322232223222 | 3222 |

FRACTIONAL FRAMES

FIG. 16

SIMULTANEOUS ANALOG AND DIGITAL COMMUNICATION USING FRACTIONAL RATE ENCODING

CROSS-REFERENCE TO RELATED APPLICATION

Related subject matter is disclosed in the application filed concurrently herewith and assigned to the same assignee hereof entitled "Simultaneous Analog and Digital Communication", inventors Gordon Bremer and Kenneth D. Ko.

FIELD OF THE INVENTION

This invention relates to simultaneous transmission of analog and digital signals and, more particularly, to simultaneous transmission of analog signals and digital signals in a non-multiplexed manner and in a co-extensive frequency band.

DESCRIPTION OF THE PRIOR ART

In the prior art, when voice and data is transmitted simultaneously over a channel, it is typically transmitted either via frequency-division multiplexing or time-division multiplexing. In frequency-division multiplexing, the data channel and the voice channel are allocated different sub-bands of the channel's bandwidth. Examples of that are U.S. Pat. No. 4,757,495, U.S. Pat. No. 4,672,602, and U.S. Pat. No. 4,546,212. In time-division multiplexing arrangements, voice signals are sampled, digitized and interleaved with digital data to form a single information stream which is communicated over the available channel. Practically every digital carrier system (e.g. the T1 carrier system) is an example of that.

U.S. Pat. No. 4,512,013, issued Apr. 16, 1985, presents an interesting approach that is close to a frequency division multiplexing arrangement for simultaneous voice and data. The arrangement filters the speech signal and adds thereto a modulated narrowband signal to form the transmitted signal. The narrowband modulated signal derives from a narrow-band digital input signal that is modulated with a carrier, thereby shifting the narrow-band up in frequency to a position in the spectrum where there is little speech energy. At the receiver, in reliance of the fact that the speech power is low in the narrowband occupied by the modulated digital signal, the digital signal is recovered through appropriate demodulation. Thereafter, the recovered digital signal is remodulated to replicate the transmitter's operation, adaptively filtered to account for channel characteristics, and subtracted from the received signal. The result is the received speech. As indicated above, one salient characteristic of that arrangement, as stated in col. 2, lines 13–18, is that "... an entire analog speech signal and a modulated data signal are capable of being transmitted over a normal analog channel by the multiplexing of the data signal within the portion of the normal analog speech signal frequency band where the speech signal is present and the power density characteristic thereof is low". As an aside, the 4,512,013 arrangement is half duplex.

In the modem art, digital information is communicated over a channel by converting the digital information to analog form. In the most basic form, a modem filters the digital signal (i.e., shifts it in frequency) to form a band-limited signal and modulates that signal to reside within the passband of the communication channel. In telephony, for example, that passband may be between 300 Hz and 3500 Hz. To increase the information-carrying capacity of the modulated signal, more sophisticated modems employ quadrature modulation. Quadrature modulation is often depicted as a two-dimensional signal space. Use of the signal space to send voice information is disclosed in U.S. Pat. No. 5,081,647 issued Jan. 14, 1992.

Use of the signal space to send data and voice in described is "High Speed Digital and Analog Parallel Transmission Technique Over Single Telephone Channel", Ajashi et al, *IEEE Transactions on Communications*, Vol. 30, No. 5, May, 1982, pp. 1213–1218. Unlike prior techniques, where analog and data were segregated into different time slots (TDM) or different frequency bands (FDM), they describe separating analog and data signals into the two different channels of the QAM system. That is, Ajashi et al suggest modulating the in-phase channel with the analog signal, and modulating the quadrature channel with the data signal. Building on that description and concerning themselves with channel equalization, Lim et al analyze equalizer performance in "Adaptive Equalization and Phase Tracking For Simultaneous Analog/Digital Data Transmission", *BSTJ*, Vol. 60 No. 9, Nov 1981, pp. 2039–2063. (The 1981 *BSTJ* article cites the information of 1982 *IEEE* article as "unpublished work").

No one has achieved the ability to simultaneously sent both data and voice through both channels of a QAM system, and no one has achieved the ability to communicate both by data and analog, simultaneously, and in full-duplex, over a single bidirectional bandlimited communications channel.

SUMMARY OF THE INVENTION

The present invention simultaneously transmits data signals and analog signals by adding an analog signal to a data signal before transmission. The invention uses symbol constellations in which the number of symbols are not limited to $2^c$ where c is an integer. Removing this limitation increases the number of symbol constellations that may be used and thereby permits more efficient use of a communication channel's bandwidth.

A fractional rate encoding technique, disclosed in U.S. Pat. No. 5,103,227 entitled "Modulos Converter for Fractional Rate Encoding", is used to encode a non-integer number of bits per symbol; however, other methods may also be used. Using a non-integer number of bits per symbol permits using symbol or signal point constellations in which the number of signal points m, is the nearest integer larger than $2^c$ where c is a fraction which approximates the ratio of the bit rate divided by symbol rate, or in other words, c is the number of bits per symbol. The fractional encoding is carried out by partitioning incoming data bits into words with a preselected number of words forming a frame. The frame undergoes a modulus conversion with the number of signal points or symbols composing the constellation being used as a modulus, and with the number of words composing the frame being equal to the number of digits that represent the frame after the modulus conversion. Each of the digits are used to specify a symbol to be transmitted. As a result, a frame comprising x bits that have been divided into y words, can be represented by y symbols, where each symbol represents c bits and c is a non-integer that equals x/y.

The invention provides a communication method that produces a data signal by mapping data bits into a symbol constellation that has a plurality of symbols. Each of the symbols represent a noninteger number of the data bits. A second signal, such as an analog signal, is added to the data signal to form a combined signal that is transmitted over a communication channel using orthogonal modulation.

BRIEF DESCRIPTION OF THE DRAWING

FIG. 15 shows a table indicating the fractional data rate and the corresponding number of signal points for various input data rates and symbol rates;

FIG. 16 shows how an incoming data bit stream is partitioned into frames of various lengths for various symbol rates;

DETAILED DESCRIPTION

Figure 1:
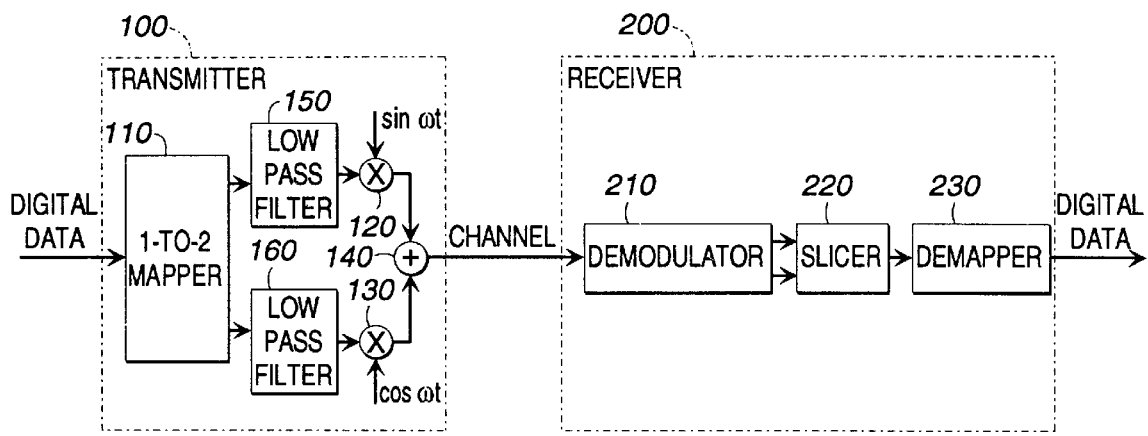
FIG. 1 presents the basic structure of a prior art modem.

To place this invention in context, FIG. 1 presents a very basic block diagram of a modem that communicates digital data via quadrature modulation techniques. Section 100 is the modem's transmitter section and section 200 is the modem's receiver section. Specifically, in the transmitter section digital data is applied in FIG. 1 to a 1-to-2 mapper 110, and mapper 110 develops two outputs which typically are referred to as the in-phase and quadrature samples. The in-phase samples are applied via low pass filter 150 to modulator 120, which multiplies the applied signal by a carrier——i.e, $\sin \omega t$ in FIG. 1. The quadrature samples are applied via low pass filter 160 to modulator 130, which multiplies the applied signal by a second carrier. The second carrier is orthogonal to the first carrier, namely, $\cos \omega t$. Filters 150 and 160 must be bandlimited to no more than $\omega$, in order to avoid aliasing and to at least half the inverse of the output sample rate of mapper 110. The output signals of modulators 120 and 130 are added in element 140 to develop the analog signal of the modem's transmitter section.

In operation, the digital data applied to the FIG. 1 apparatus is a stream of bits. Element 110 views the incoming signal as a stream of symbols that each comprises a preselected number of consecutive bits, and maps each symbol into an in-phase analog sample and a quadrature analog sample.

Figure 2:
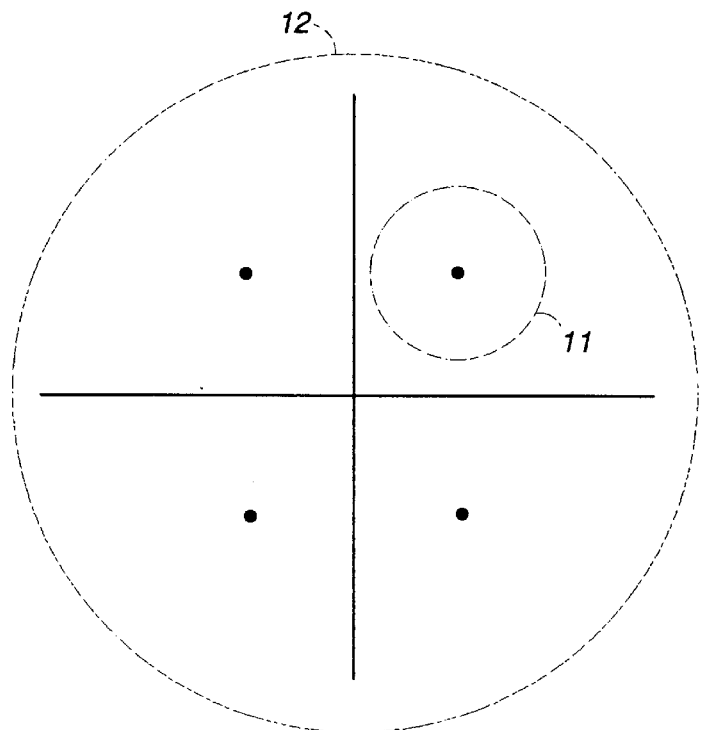
FIG. 2 shows the signal space and an illustrative signal constellation for the FIG. 1 system.

Practitioners in the art often describe the operations performed in the FIG. 1 apparatus by means of a signal space diagram, such as shown in FIG. 2. The x axis corresponds to one of the carrier signals (e.g., $\cos \omega t$) and the y axis corresponds to the other carrier signal ($\sin \omega t$). The in-phase and quadrature samples delivered by element 110, in effect, specify a location in the signal space of FIG. 2. Accordingly, the set of possible samples that element 110 can produce corresponds to a set of sample points (i.e., a constellation of points) in the signal space depiction of FIG. 2. A 4-point signal constellation is shown, by way of illustration, in FIG. 2. It is well known, however, that one can create signal point constellations with a larger number of signal points.

To receive signals that were modulated by the FIG. 1 apparatus in accordance with the specific constellation depicted in FIG. 2, one must only identify whether the received signal is in the first, second, third or fourth quadrant of the signal space. That means that there exists great latitude in the signals that are received, and any received signal that is still in the correct quadrant is mapped to the correct constellation signal point in that quadrant. Extended to other (and perhaps larger) constellations, the signal space can be divided into regions and the receiver's decision is made with respect to the region in which the received signal is located. We call these regions "neighborhood" regions.

Returning to FIG. 1 and addressing the modem's receiver section, the modulated signal is applied to demodulator 210. Demodulator 210 recovers the in-phase and quadrature components and applies them to slicer 220. Slicer 220 converts the in-phase and quadrature components into symbols and applies the symbols to de-mapper 230. De-mapper 230 maps the symbols into bit streams to form the recovered digital data stream.

Absent any signal degradation (such as due to noise added in the channel) the signal received by demodulator 210 would be precisely the same as the signal sent by adder 140, and a determination of neighborhood regions in which the signal is found (by slicer 220) would be relatively simple and error-free. However, noise that is added to the transmitted signal shifts the received signal in the signal space and modifies the input to slicer 220. Stated in other words, a noise signal that adds to the signal flowing through the communication channel corresponds to a vector signal in the signal space of FIG. 2 that is added to a transmitted sample point. That added vector is of unknown magnitude and unknown phase. Consequently, added noise converts a transmitted signal that corresponds to a point in the signal space into a region in the signal space. This phenomenon is depicted in FIG. 2 by circle 11. Some refer to this circle as a signal space "noise cloud" surrounding the transmitted signal.

From the above it is clear that in order to detect the transmitted signals without errors, the neighborhood regions must be large enough to encompass the noise cloud. Since the average power of the sent signal is typically limited by other considerations, the extent to which the signal constellation covers the infinite space represented by the x and y axes is also limited This is represented in FIG. 2 by circle 12. The restriction imposed by circle 12, coupled with the restriction on the size of the neighborhood regions that is imposed by noise considerations limits the number of transmitted signal points in the constellation.

Figure 3:
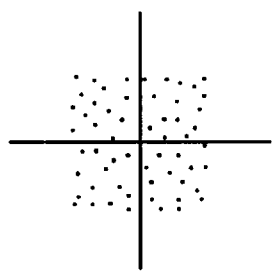
FIG. 3 shows the signal space of a QAM analog system.

As indicated above, it has been observed that in typical modem designs the allowable signal power and the expected fidelity of the channel combine to control the constellation size. Less noisy channels allow for larger constellations, and larger constellations permit higher digital data throughputs. This leads to a totally revolutionary idea of utilizing all, or essentially all, of the available signal space for the transmission of information. A transmitter signal space in accordance with this revolutionary approach is depicted in FIG. 3 where a plurality of signal points are depicted randomly within the signal space. These points are illustrative of the various vectors that the transmitter is allowed to send out. There are no more "constellations of points", where a decision must be made between constellation points; there is only the entirety of the signal space. In other words, rather than having digital signals that are mapped onto a fixed constellation within a signal space, FIG. 3 depicts analog signals that are mapped onto a signal space. When the analog signals that form the in-phase component are independent of the analog signals that form the quadrature component, the viable signal space of FIG. 3 may be rectangular.

Having recognized the advantages of sending analog signals in accordance with the signal space of FIG. 3, the next innovation is to alternate between the signal spaces of FIG. 2 and FIG. 3. That is, the innovation is to send customer analog signals or customer digital signals as the need arises. This is depicted in FIG. 4.

Figure 4:
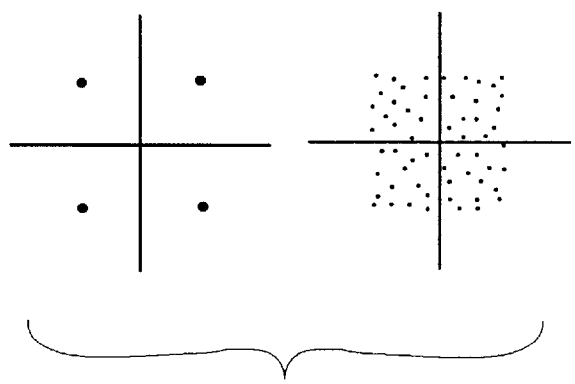
FIG. 4 shows the signal space of an alternating digital and analog system.

Further, having recognized the advantages of sending either analog or digital signals in accordance with the signal spaces of FIG. 4, it was discovered that a totally different communication approach can be taken, that communicating both analog and digital signals, can be expressed concurrently, in a combined signal space. This is illustrated in FIG. 5, where four neighborhoods are identified for illustrative purposes, with demarcation borders identified by dashed lines 21 and 22.

Figure 5:
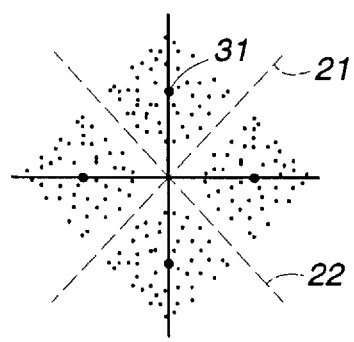
FIG. 5 shows the signal space of a combined digital and analog system.

It may be noted that, for purposes of this disclosure, according to the FIG. 5 depiction, the analog signals that form "signal clouds" around each digital constellation point (e.g., point 31) should be restricted in their dynamic range to be totally contained within the neighborhood regions. Hence, here too there is a trade-off between constellation size (which directly affects digital through-put) and dynamic range of the transmitted analog signal (which in some situations translates to "resolution").

Figure 6:
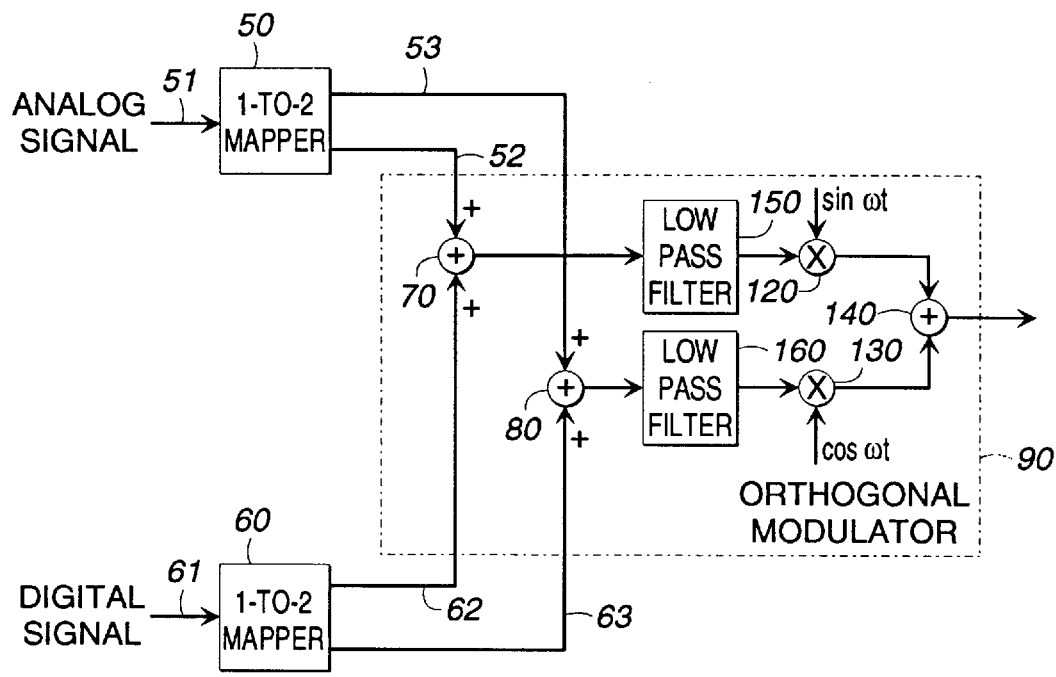
FIG. 6 presents one embodiment of a transmitter section for a combined digital and analog system.

FIG. 6 depicts an arrangement that very basically illustrates the principles of this invention. It includes a 1-to-2 dimensional mapper 60 responsive to digital signals applied on line 61. Mapper 60 develops two output signals on lines 62 and 63, each of which possesses pulses with quantized amplitudes that relate to the digital signals arriving on line 61. FIG. 6 also includes a 1-to-2 mapper 50 that responds to an applied analog signal on line 51, and it develops two output signals on lines 52 and 53, each of which possesses pulses with continuous amplitudes that relate to the analog signal on line 51. Outputs 52 and 62 are combined in adder 70 and outputs 53 and 63 are combined in adder 80. The outputs of adders 70 and 80 form the components of the signals that are represented by the signal space of FIG. 5. As in FIG. 6, the outputs of adders 70 and 80 are applied via low pass filters 150 and 160 to modulators 120 and 130 and summed in adder 140 to form a modulated signal as is typically known in the modem art.

In FIG. 6 element 60 is depicted as a 1-to-2 mapper. However, it should be understood that element 60 can be an M-to-N mapper. That is, element 60 can be responsive to a plurality (M) of digital signals and it can develop a different plurality (N) of output signals. Similarly, element 50 can be a J-to-K encoder that is responsive to a plurality of analog signals. Likewise, the collection of elements that follow elements 50 and 60 (i.e., elements 70, 80, 120, 130, 140, 150 and 160), which form orthogonal modulator 90 can be constructed to be responsive to whatever plurality of outputs of that elements 50 and 60 are designed to produce. More specifically, those elements must account for all of the applied input signals, and that means that they must be able to handle K or N signals, whichever is larger. In such a circumstance, however, the user can assume that the larger of the two (K or N) is the dimensionality of the system, and some of the dimensions have either no digital data, or no analog data, whichever applies. Of course, if there are "dimensions" for which there is no digital or analog data, other information can be sent over those dimensions, such as equalization "side" information.

Figure 7:
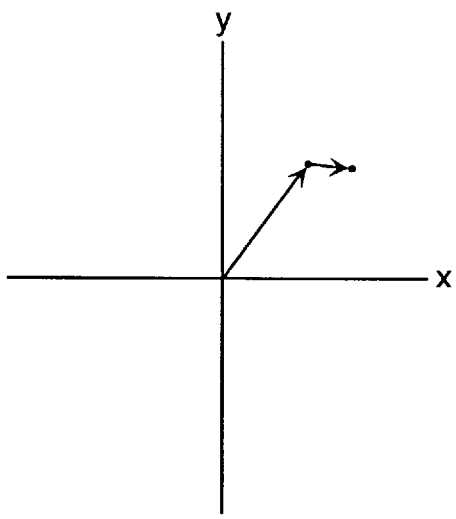
FIG. 7 presents one orthogonal modulation approach.

In the context of a signal space, the N pluralities of output signals of elements 50 and 60 (assuming N is larger than K) correspond to the collection of components of vectors in multi-dimensional space; e.g., N-dimensional space. The coordinates of this multi-dimensional space correspond to the orthogonal modulation signals within orthogonal modulator 90. In FIG. 6, the two orthogonal modulation signals are $\cos\omega t$ and $\sin\omega t$, but other modulation signals are also possible; for example, code division multiplexing (CDMA) templates. For purposes of this invention, orthogonal modulation signals are modulation signals that develop a transmitted signal comprising concurrent element signals and yet allow the receiver to separate the received signal into its constituent element signals, those being the signals developed in response to each of the modulation signals. It may also be observed that, relative to FIG. 5, orthogonal modulator 90 performs vector summation of the symbol vector represented by the components developed by element 60 with the analog information vector represented by the components developed by element 50. This is depicted in FIG. 7.

Figure 8:
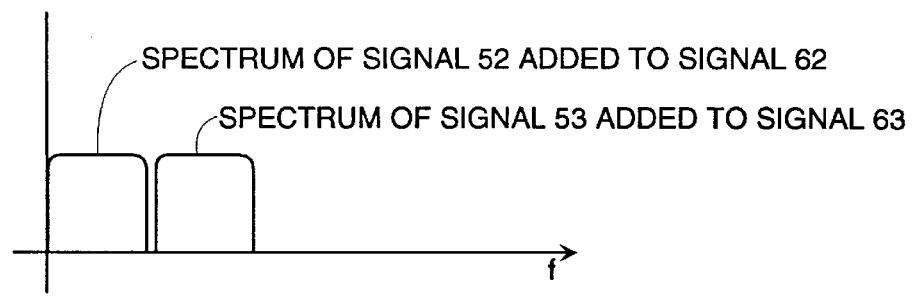
FIG. 8 depicts the vector addition that forms the signal space of FIG. 5.

In connection with FIG. 1, it may be noted in passing that the principles of this invention may be utilized even when the output signals of adders 70 and 80 are communicated (e.g., transmitted) directly, without the benefit of combining them in orthogonal modulator 90. Also, orthogonal modulator 90 can simply be a bandshifting means. To the extent that the output of adder 70 (for example) is bandlimited, the output of adder 80 can be shifted beyond the band-limited output signal of adder 70 and combined with the output signal of adder 70. This is presented in FIG. 8. It may also be appreciated that the principles of this invention may be exercised without the use of element 60 in those situations where no digital streams are presented.

To this point in the instant disclosure the implication has been that the input signal applied to element 50 of FIG. 6 is analog. However, that does not have to be strictly the case. In accordance with conventional techniques, an analog signal that is bandlimited can be sampled (within the proper Nyquist bounds). Hence, it should be understood that the input signal to element 50 can be a sequence of analog samples. Moreover, a sampled analog signal can be quantized and represented in digital form. Indeed, an analog signal that has been sampled and converted to digital form can then be converted to amplitude quantized pulse amplitude-modulated format. All of those representations are representations of an analog signal. For example, the collection of the amplitude-quantized PAM pulses is identical to the original analog signal within the bounds of the quantization errors introduced by the sampling and quantizing (A/D conversion followed by D/A conversion) processes.

The fact that sampling and amplitude quantization of the analog signal at the input of element 50 is permitted offers a number of benefits. For one, it allows the signal to be presented to element 50 in digital format. For another, it permits simple multiplexing of different information sources. Thus, for example, elements 50, 60 and 90 can be implemented in accordance with present day modem realizations; i.e., with one or more microprocessors operating under stored program control.

Figure 9:
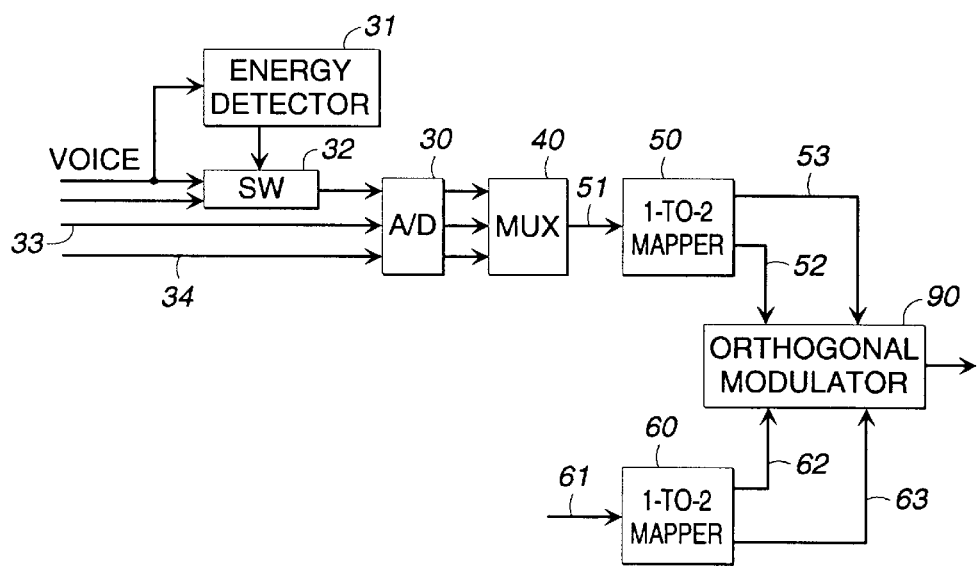
FIG. 9 illustrates the arrangements that permit more than one analog signal source to be transmitted simultaneously.

An example of input signal multiplexing is shown in FIG. 9, which presents an embodiment that includes an A/D converter bank 30 followed by a multiplexer 40. Converter bank 30 converts a plurality of analog signals, such as on lines 33 and 34, to digital format and multiplexer 40 multiplexes its input signals and applies them to element 50. Elements 30 and 40 are conventional A/D and multiplexer elements, respectively.

The combination of elements 30 and 40 allows applying a number of narrowband analog signals to orthogonal modulator 90. The primary limitations are the carrier frequency and the allowable transmission bandwidth of the channel. The narrowband signal can, of course, come from any source. For example, a system installed in an ambulance may sacrifice some voice bandwidth in order to allow narrowband telemetry data of blood pressure and heart pulse rate to be communicated concurrently with the voice.

Additionally, a voice signal energy detector may be included, such as disclosed in U.S. Pat. No. 5,081,647, which would detect periods of silence and send less urgent telemetry data during those silence periods. This is illustrated by elements 31 and 32 in FIG. 9.

The fact that the input to element 50 is digital (in a digital implementation of elements 50, 60 and 90) and that the input to element 60 is also digital should not be confused. The digital input to element 60 is a stream of digits that are each equally important. Hence, those digits are converted into symbols and the symbols into constellation points, and the constellation points are within neighborhoods which are identified by a slicer (e.g., slicer 220 in FIG. 1) within a modem's receiver section. In contradistinction, the digital signals applied to element 50 correspond to digital words that represent amplitude, and the specific interrelationship between adjacent bits of the digital words is maintained. As indicated above, the signal cloud around a signal point within a constellation does not represent a plurality of signal points that must be distinguished, and that is a fundamental distinction.

Figure 10:
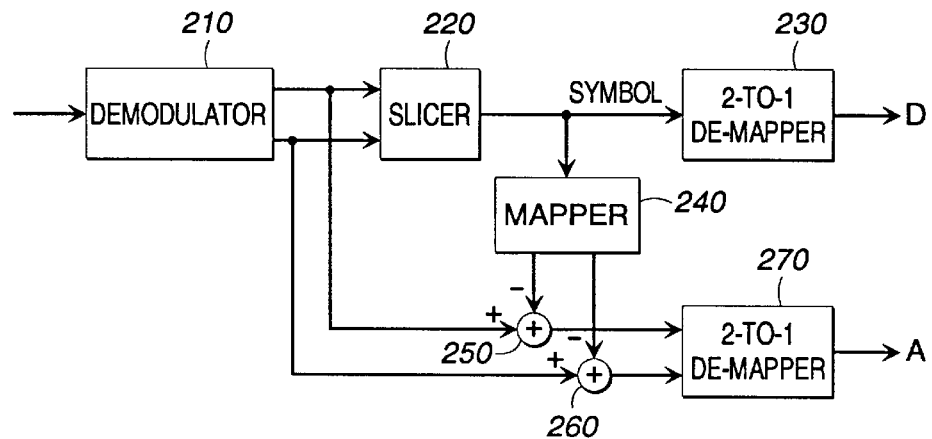
FIG. 10 details the major elements in a receiver in accordance with the principles of this invention.

FIG. 10 presents a basic block diagram of a modem's receiver section in conformance with the principles of this invention. The modulated input signal received from the channel is applied to demodulator 210 which develops the in-phase and quadrature components. Those are applied to slicer 220 which identifies the symbols, and the symbols are applied to de-mapper 230. All this is in accord with conventional modem approaches, as described in connection with FIG. 1. In addition, FIG. 10 includes a mapper 240 that is responsive to the symbols developed by slicer 220. The output of mapper 240 is an accurate estimate of the set of in-phase and quadrature components (that are applied in the FIG. 1 arrangement to elements 150 and 160). The outputs of mapper 240 are subtracted from the outputs of demodulator 210 in subtracters 250 and 260. The outputs of subtracters 250 and 260 are applied to 2-to-1 de-mapper 270 which recombines the analog samples to form an estimate of the original analog signal. De-mapper 270 performs the inverse function of mapper 50.

It may be noted that slicer 220 can be designed to directly provide the output signals that mapper 240 develops; and moreover, de-mapper 230 can be made responsive to such signals. That would alter the FIG. 10 in the sense that slicer 220 and mapper 240 would combine to form a single element and de-mapper 230 as well as adders 250 and 260 would be responsive to that combined element In analog realizations of this invention (e.g., FIG. 6), mapper 50 is responsive to analog signals. Various approaches can be taken to develop the plurality of outputs (two outputs, in the case of element 50 shown in the FIGS.). For example, a single bandlimited analog signal can be divided into a plurality of baseband signals by simply filtering and modulating selected sub-bands. Alternatively, element 50 can accept a plurality of bandlimited analog signals and assign each one of the plurality of bandlimited analog signals to different outputs of element 50.

In time sampled realizations of this invention (whether the realization continues with analog circuitry or digital circuitry), element 50 can simply route alternate samples of a single analog signal to different outputs of element 50, or multiplex a plurality of analog signals and distribute the samples of those signals in any convenient manner.

In order to allow for nonlinear techniques that may be employed to enhance the communication qualities of this invention, it is important to effect equalization of the channel in order to minimize intersymbol interference. Conventional modem technology can be brought to bear to this need.

Figure 11:
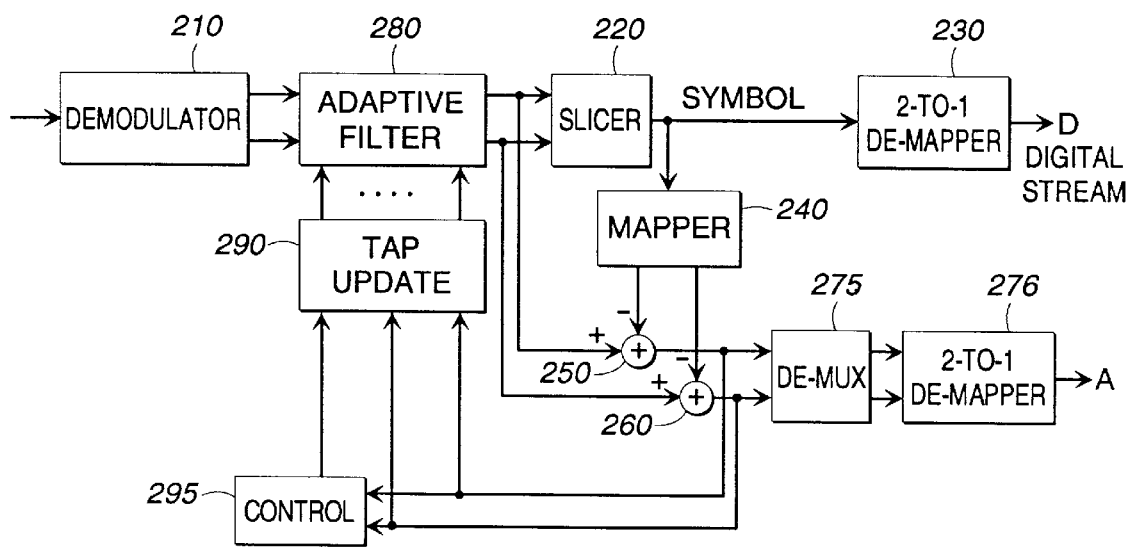
FIG. 11 presents a block diagram of a receiver that includes adaptive equalization.

FIG. 11 presents a block diagram of an arrangement that incorporates equalization. Specifically, FIG. 11 is depicted with a modulator that is followed by equalization hardware (which together can be thought of as a super-demodulator). The equalization hardware comprises an adaptive filter 280 that is interposed between demodulator 210 and slicer 220. The operational characteristics of filter 280 are controlled by filter coefficients that are stored——in modifiable form——within tap update block 290. Tap update block 290 is responsive to the output signals of subtracters 250 and 260. The adaptation of filter 280 is carried out in accordance with conventional modem techniques. The outputs of subtracters 250 and 260 are also applied to demultiplexer 275 and the outputs of demultiplexer 275 are applied to de-mapper 276. De-mapper 276 comprises a bank of de-mappers 270 of FIG. 10. Elements 275 and 276 are included to illustrate a receiver that is adapted for applications where a plurality of analog inputs are multiplexed. Of course, in applications where there is no multiplexing, de-mapper 270 can be substituted.

In accordance with some adaptation approaches, it is easiest to carry out adaptation and the corresponding coefficient updates when the power in the analog signal is small. To limit the process to such intervals, FIG. 11 includes a power detector within control element 295 that is responsive to subtracters 250 and 260. Block 295 is also conventional. It includes a power detection circuit that evaluates the power contained in the signals of subtracters 250 and 260 and delivers a control signal to block 290 to enable (or disable) the coefficient updating process. Of course, block 295 may be more generic, in that the control signal can be derived from other than the analog signal, such as from side information from the transmitter.

FIG. 11 depicts one arrangement for effecting equalization of the transmission channel between a sending modem's transmitter section and a receiving modem's receiver section; to wit, at the receiver's front end, following the demodulator. However, it is well known that equalization can be performed anywhere along the channel, going back even to within a modem's transmitter section.

Figure 12:
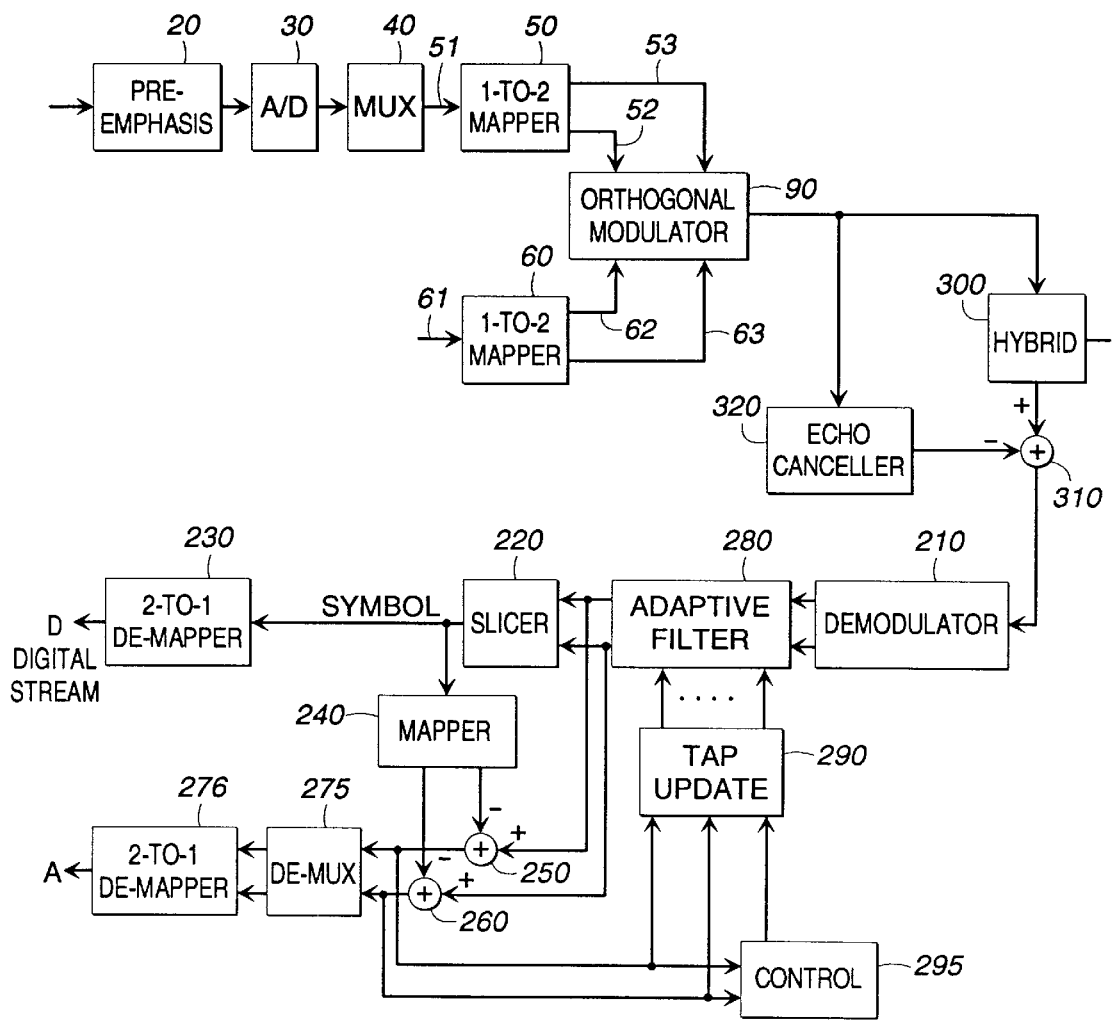
FIG. 12 presents the block diagram of an entire modem.
Figure 13:
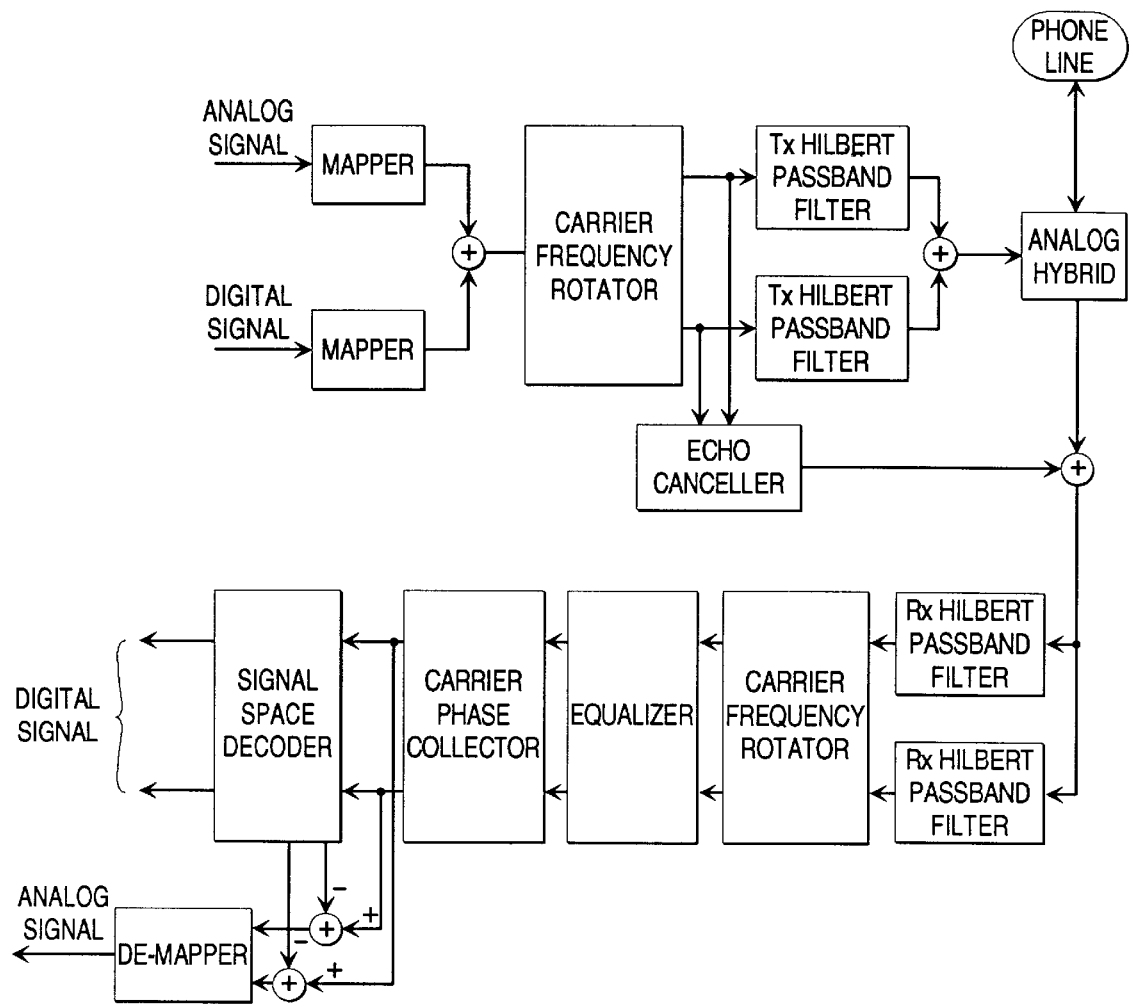
FIG. 13 presents a slightly different embodiment of the FIG. 12 modem.

FIG. 12 depicts the entire, full duplex, modem constructed in accordance with the depictions of FIGS. 9 and 11. More specifically, a transmitter section (FIG. 9) is coupled with a receiver section (FIG. 11) through hybrid 300 and subtracter 310. Subtracter 310 cooperates with echo canceller 320 in the conventional way to subtract unwanted signals from the signal applied to demodulator 210. For sake of simplicity, echo canceller 320 is shown to connected to the output of orthogonal modulator 90, and in analog embodiments of element 320 this is perfectly satisfactory. However, in digital embodiments it is well known that efficiencies can be realized by having the echo canceller be responsive to the outputs of mapper 60, where the signal rate is much lower. An improvement which incorporates the principles of this invention is shown in FIG. 13. It may be noted that some of the elements in FIG. 13 are designated by different labels; such as "Hilbert passband filter", which corresponds to a modulator, etc. These are circuits that attain the desired results through somewhat different calculations and are well known to persons skilled in the modem art.

The echo cancelling is performed, as in all modems, during a training period, when the far end signal source is silent and the echo canceller is adapted to minimize the output of subtracter 310.

Figure 14:
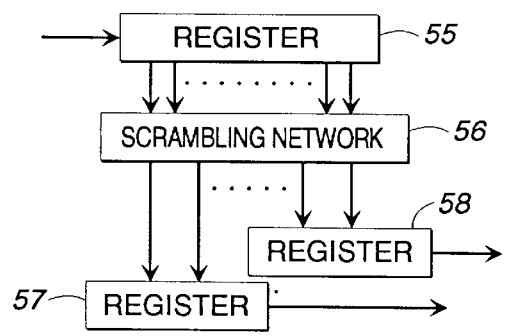
FIG. 14 depicts one structure for scrambling analog samples.

In connection with FIG. 6 it has been disclosed that the input to element 50 can be a sampled analog signal, as well as an unsampled analog signal. It has also been disclosed above that when element 50 is a 1-to-2 mapper (as compared to 1-to-N mapper) and the desired output of element 50 is pairs of a sampled analog signal, the pairs of analog samples can be derived by simply delaying the incoming analog signal by 1/B and sampling both the delayed and the undelayed versions at rate B. This provides sample pairs that correspond to adjacent samples of the original analog signal sampled at rate 1/2B seconds. Actually, privacy of the communication is enhanced when the samples are not adjacent, and FIG. 14 presents one approach for deriving pairs from non-adjacent samples. It basically includes an input register 55 for storing K analog samples that arrive at rate 2B, a scrambling network 56 that scrambles the outputs of register 55 and develops K outputs, and registers 57 and 58 that are responsive to the outputs of network 56. Registers 57 and 58 store K/2 analog samples every K/2B seconds and output the stored samples at rate 1/2B seconds. Scrambling network 56 may be simply a cross-connect field.

Other configurations are possible and other elements can be included to enhance operation of the configurations. For example, the "analog" input that enters orthogonal modulator 90 can be filtered to pre-emphasize the high frequencies and, correspondingly, the "analog" output of subtracters 250 and 260 can be filtered to remove the pre-emphasis. The preemphasis can be effected, for example, within the A/D converter 30 or even prior thereto, such as in pre-emphasis filter 20 shown in FIG. 12. The filtering can be done while the "analog" signal is truly analog, or it could be done when the "analog" signal is represented digitally——such as when the transmitter and receiver sections are effected with digital hardware.

Other configurations are possible and other elements can be included to enhance operation of the configurations. For example, the "analog" input that enters orthogonal modulator 90 can be filtered to pre-emphasize the high frequencies and, correspondingly, the "analog" output of subtracters 250 and 260 can be filtered to remove the pre-emphasis. The preemphasis can be effected, for example, within the A/D converter 30 or even prior thereto, such as in pre-emphasis filter 20 shown in FIG. 12. The filtering can be done while the "analog" signal is truly analog, or it could be done when the "analog" signal is represented digitally——such as when the transmitter and receiver sections are effected with digital hardware.

A very common symbol rate for modems is 2400 symbols/sec. As shown in FIG. 15, at this symbol rate, for a data rate of 7200 bits/sec, each symbol corresponds to 3 bits, for a data rate of 9600 bits/sec, each symbol corresponds to 4 bits, and so on. Furthermore, in a QAM modulation scheme, 8 signal points or symbols are required for 7200 bits/sec, 16 signal points or symbols are required for 9600 bits/sec and so on. In general, the number of points required for a given data and symbol rate is given by $m=2^c$, where c=bit rate/symbol rate (c also represents the number of bits per symbol) and is generally an integer.

However, many channels can now be used for broader bandwidth data transmission. For example, standard leased telephone cable can be used to transmit 3200 symbols/sec reliably. Submarine cables can be used to transmit 2800 symbols/sec. Therefore, fractional rate encoding techniques are needed to transmit data efficiently at these higher baud rates. In fractional rate encoding the number of symbols or signal points m is the nearest integer larger than $2^c$ where c is a fraction which approximates the ratio of bit rate/symbol rate (or bits per symbol). As shall become apparent from the discussion below, the divisor of c is preferably small. FIG. 15 shows some ratios selected for various bit and symbol rates, and the corresponding number of signal points m required for QAM data transmission.

The improvement in the performance of fractional encoding over standard encoding is significant, and it may be expressed as $i=10\log(m_1 b_1/m_2 b_2)$ where i is an indicia for performance, $m_1$ is the number of symbols or constellation points using standard QAM techniques at symbol rate, $b_1$, and $m_2$ is the number of symbols or constellation points for fractional QAM encoding at symbol rate, $b_2$. For example from the table in FIG. 15, for 24000 bits/sec at $b_1$=2400 symbols/sec, the number of bits per symbol is 10 and the number of signal points $m_1$=1024 ($m_1=2^{24000/2400}$). If the symbol rate is increased to $b_2$=2743, the number of bits per symbol is approximately 8.75 (24000/2743), and the number of signal points required for the same bit rate is reduced to $m_2$=431 ($m_2$=smallest integer $\geq 2^{24000/2743}$). The improvement in the performance is then about 3.18 db.

Inspection of the table in FIG. 15 indicates that for a given symbol rate, the divisor for c for each bit rate is either the same (for example 7 for a 2800 symbol rate) or have a common multiple. For example, for 3086 symbol rates the division is either 3 or 9. For 3200 symbol rates, the divisor is either 2 or 4. This divisor shows the number of symbols required to send the number of bits indicated by the dividend. For example for a 3200 symbol rate, 24000 bits/s transmission ratio c=15/2 indicating that 2 symbols are required to send 15 bits, using a QAM scheme of 182 signal points or symbols (182=smallest integer $\geq 2^{15/2}$).

In the present invention, the fractional rate (or fractional number of bits per symbol) encoding is accomplished as follows. First the incoming binary data bits are partitioned into words with a preselected number of words forming a frame. The frame undergoes a modulus conversion with the number of signal points or symbols composing the constellation being used as a modulus, and with the number of words composing the frame being equal to the number of fractionally encoded words that represent the frame after the modulus conversion. Each of the fractionally encoded words are used to specify a symbol to be transmitted. More particularly, the number of bits per frame is equal to the numerator of the ratio c as defined above. The number of words per frame is equal to the divisor of ratio c. Each word is made up of an integer number of bits and the number of bits per word may be different. Output data will be grouped into fractionally encoded words or remainders which may contain a fractional number of bits identified by $\log_2 m$ where m is the modulus or number of symbols in the symbol constellation that will be used to transmit information. All fractionally encoded words will have the same modulus for efficient transmission. Input data is in binary words. Output data is in fractionally encoded words. Advantageously, for a given symbol rate, while the number of bits per word may change, the same number of words is grouped to form frames having the same number of bits. FIG. 16 shows how bits may be arranged into words and the words may be grouped into frames. For example, for a 3200 symbol rate the number of words per frame is selected to equal the least common multiplier for the divisors, i.e., four. Then for 24000 bits/sec at 3200 symbols/sec each sequential 30 binary bits are partitioned into four words, the first and third words containing 8 bits and second and fourth words containing 7 bits. Similarly, as shown in FIGS. 15 and 16 for 3200 symbol/sec, 7200 bit/sec transmission, c=914. Therefore, a frame is used to transmit four words. The first word contains or corresponds to three bits, and the remaining words contain 2 bits each. A frame undergoes a modulus conversion with the number of signal points composing the constellation being used as a modulus, and thereby produces four fractionally encoded words as detailed below. The fractionally encoded words are then fed to mapper 600 in FIG. 17.

Figure 17:
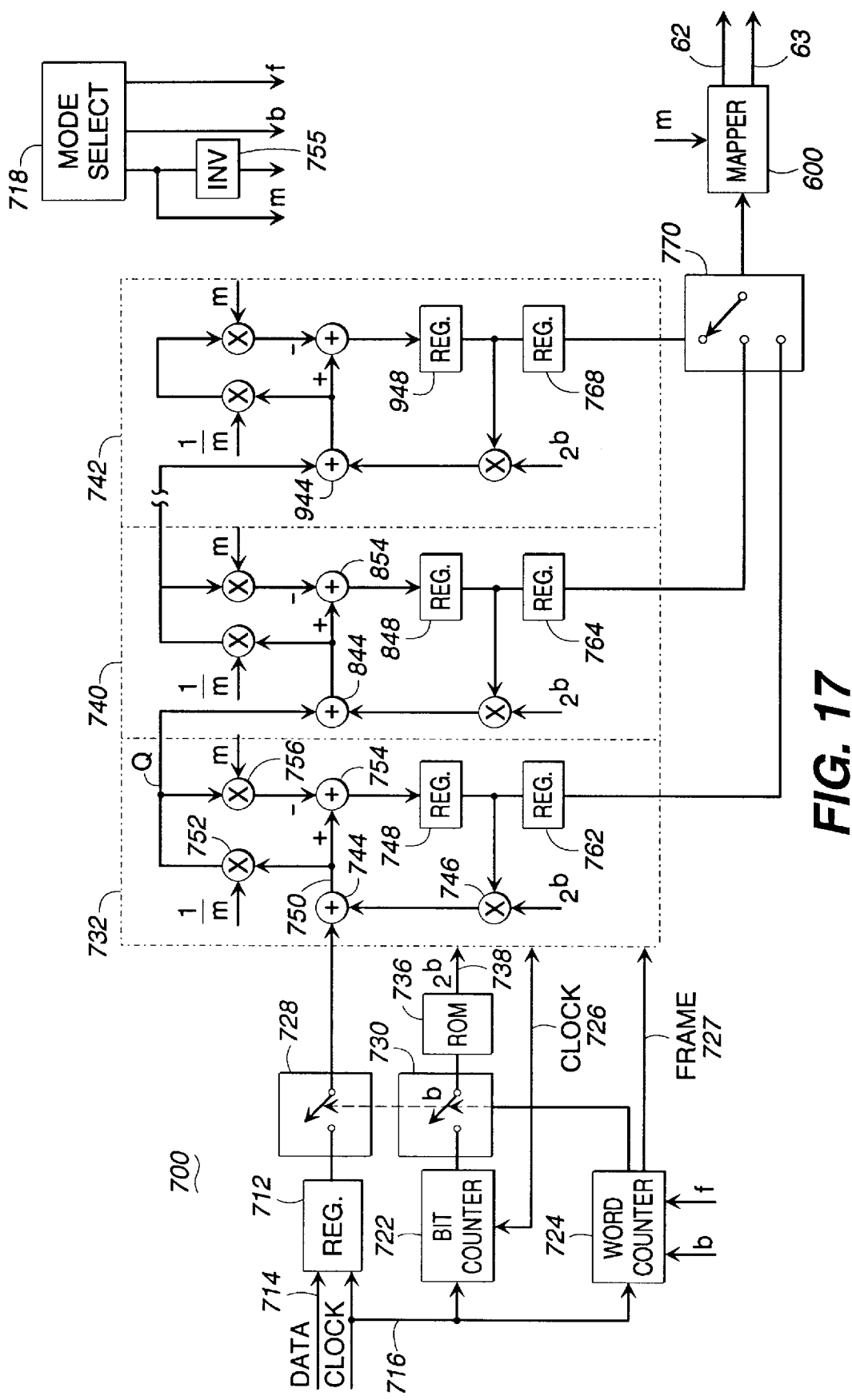
FIG. 17 shows a block diagram for a fractional rate encoder.

Details of a circuit used for modulus conversion are shown in FIG. 17. The circuit 710 includes a serial in-parallel out shift register 712 for receiving data bits on line 714, under the control of clock pulses on line 716. A mode selector 718 is used to set up the circuit to convert the data bits in accordance with the bit rate received on line 714 and the symbol rate of the particular channel used. Based on these parameters, the mode selector generated three control parameters for the modula, i.e., m, the number of signal points used by mapper 600 to transmit the data signals; b, the number of bits per each word; and f, the number of words per frame, as defined in FIGS. 15 and 16. The parameters, m and f, are constant for a given pair of symbol and bit rates. The parameter b changes as shown in FIG. 15. For example, for a 24000 bit/sec, 3200 symbol/sec. transmission, m=182, f=4 and b=7 or 8.

The clock pulses on line 716 are used by bit counter 722 and a word counter 724. For the example given above (i.e., 24000 bit/sec 3200 symbol/sec) initially, b=8 (see FIG. 16).

While the data bits are entered serially into register 712, counter 722 counts the bits contained therein. Word counter 724 keeps track of the number of bits received and when this number equals b, the word counter generates an enabling signal on line 726. Register 712 has an output port illustrated in FIG. 17 symbolically as a switch 728. Similarly, counter 722 has an output port symbolized by a switch 730. In response to the enabling signal on line 726, switch 728 transfers in parallel the b bits found in register 712 to a remainder cell 732. Similarly, in response to the enabling pulse on line 726, switch 730 also transmits count b from counter 722 to a look-up table such as a ROM 736. In response, ROM 736 generates a binary signal equal to $2^b$ on line 738. This $2^b$ is the modulus or base of the input data word in register 712. Finally, the signal on line 726 is also used as a clock signal to clock the various elements of the remainder cell 732, as well as the other remainder cells described more fully below.

Remainder cell 732, as well as the other remainder cells such as cells 740 and 742 are used to calculate the remainder in modulus m for the f words in a frame. More particularly, each remainder cell calculates the remainder for one of the words, with the higher remainder cells also taking into account the integer portion of the quotient generated by the previous cells. Thus, the number of remainder cells required for a conversion is equal to f. In FIG. 17, the first cell 732, second cell 740, and last or most significant digit cell 742 are shown. Since all the cells are identical, the cell between cells 740 and 742 (and more intermediate cells for converters with more words per frame) are not shown for the sake of simplicity.

For a first word $X_0$, in remainder cell 732, the bits from register 712 for a first word $X_0$ are first entered into an adder 744. Adder 744 receives a second input from a multiplier 746. Multiplier 746 multiplies the outputs of register 748 and ROM 736. Since at the end of each frame, the clear signal on line 727 clears register 748, for the first byte in register 712, the output of multiplier 746 is 0. The output of adder 744 is entered on line 750 to a multiplier 752 and an adder 754. An inverter 755 is used to invert the parameter m from mode selector 718 thereby generating a parameter 1/m described in more detail below. Multiplier 752 in effect divides the output of adder 744 by m and generates a quotient which has two components; an integer component Q and a fractional component Fr. Instead of this scheme, a true division may also be performed. However, multiplication by the inverse because it is easier and cheaper to implement is preferable. Fractional component Fr is truncated to zero. The integer component Q is multiplied in multiplier 756 by m to scale it back to the magnitude before the operation of multiplier 752. The output of multiplier 756 is fed to adder 754 which subtracts it from the output of adder 744 on line 750. The output of adder 754 is the remainder of first word $X_0$ from register 712 when divided by m. This remainder is stored in register 748 as a remainder R0. The remainder is always less than m. The quotient Q passes through adders 844 and 854 of remainder cell 40 and is stored in register 848 as a remainder R1.

If a multiplication by the inverse 1/m rather than a true division is performed, a quantizing error is introduced into the process. A check may be performed at the end of each iteration to insure that as a result of this quantizing error, the output of adder 754 is not too large. For example, the output of adder 754 may be compared to m. An output bigger than m is unacceptable. This error may be corrected by subtracting m from the output of adder 754 (several times if necessary until the adder 754 is reduced below m). For each correction, the integer component Q on line Q must be increased by one.

For the next word $X_1$, a similar iteration occurs with two exceptions: since new word $X_1$ has only 7 bits, b now is changed to 7 in accordance with the arrangement of bits shown in FIG. 16, and adder 744 adds $R_0 2^b$ to $X_1$. The rest of the remainder cells operate on this new sum as described above. The multiplier is important because it allows successive words of various bits in size to be successively converted. Conventional modulus or base conversion would require all bits in a frame to be held in a single large register with increased complexity. After four iterations, during which each of the cells is progressively brought into play, the registers in the remainder cells contain the remainders required to uniquely define f bits from register 712 in modula m. The intermediate results of the iterations and the final contents of the registers 748, 848, 948 are shown in table I below:

TABLE I

| SYMBOL PERIOD | INPUT | $R_0$ | $R_1$ | $R_2$ | $R_3$ |
|---|---|---|---|---|---|
| 0 | $X_0$ | $R_0 = \text{rem } X_0$ | $R_1 = \text{mod } X_0$ | | |
| 1 | $X_1$ | $R'_0 = 2^b R_0 + X_1$ | $R'_1 = 2^b R_1 + \text{mod } R'_0$ | $R_2 = \text{mod } R'_1$ | |
| | | $R_0 = \text{rem } R'_0$ | $R_1 = \text{rem } R'_1$ | | |
| 2 | $X_2$ | $R'_0 = 2^b R_0 + X_2$ | $R'_1 = 2^b R_1 + \text{mod } R'_0$ | $R'_2 = 2^b R_2 + \text{mod } R'_1$ | $R_3 = R'_2$ |
| | | $R_0 = \text{rem } R'_0$ | $R_1 = \text{rem } R'_1$ | $R_2 = \text{rem } R'_2$ | |
| 3 | $X_3$ | $R'_0 = 2^b R_0 + X_3$ | $R'_1 = 2^b R_1 + \text{mod } R'_0$ | $R'_2 = 2^b R_2 + \text{mod } R'_1$ | $R'_3 = \text{mod } 2^b R_3 + \text{mod } R'_2$ |
| | | $R_0 = \text{rem } R'_0$ | $R_1 = \text{rem } R'_1$ | $R_2 = R'_2$ | $R_3 = \text{rem } R'_3$ |

In this table the $R'_i$ indicates the output of the initial adder of the i-th cell. Thus, when second word $X_1$ is read into the first remainder cell 732, intermediate parameter $R'_0$ is given by $R'_0 = 2^b R_0 + X_1$.

After the remainders for all the bytes of a frame have been generated, word counter 724 generates a pulse on line 727 which, as previously mentioned, clears the registers 748, 848, 948 of each remainder cells. However, the information from these registers is transferred before clearing to respective storage registers 762, 764 and 768.

In the next four symbol periods (a symbol provides 1/symbol rate) (for f=4), the remainder cells convert the next four words as described above. Meanwhile, multiplexer switch 770 samples each of the storage register 762, 764,... 768, starting with the most significant remainder found in storage register 768. The remainders or fractionally encoded words stored therein are then sequentially transferred by switch 770 to mapper 600. The mapper also receives the modulus m from mode selector 718. The switch 770 may be stepped from one storage register to another by the clock pulses on line 726. The same clock pulses may also be used by mapper 600 to generate the data signals that specify symbols or signal points. The mapper generates a symbol or signal point constellation of m points. All remainders are limited to values between 0 and m−1. As a result, the last remainder cell 742 has a zero integer component Q, and overflow or non-zero Q is prevented. The modulus m is chosen to be the smallest integer greater than $2^c$ where c=bit rate/symbol rate. Since $m^4 \geq 2^{(b0+b1+b2+b3)}$, the modulus is chosen such that overflow can not occur. The bit rate is achieved with the smallest possible signal constellation or modulus. The output of mapper 600 is treated in the same manner as the output of mapper 60 of FIG. 6.

Figure 18:
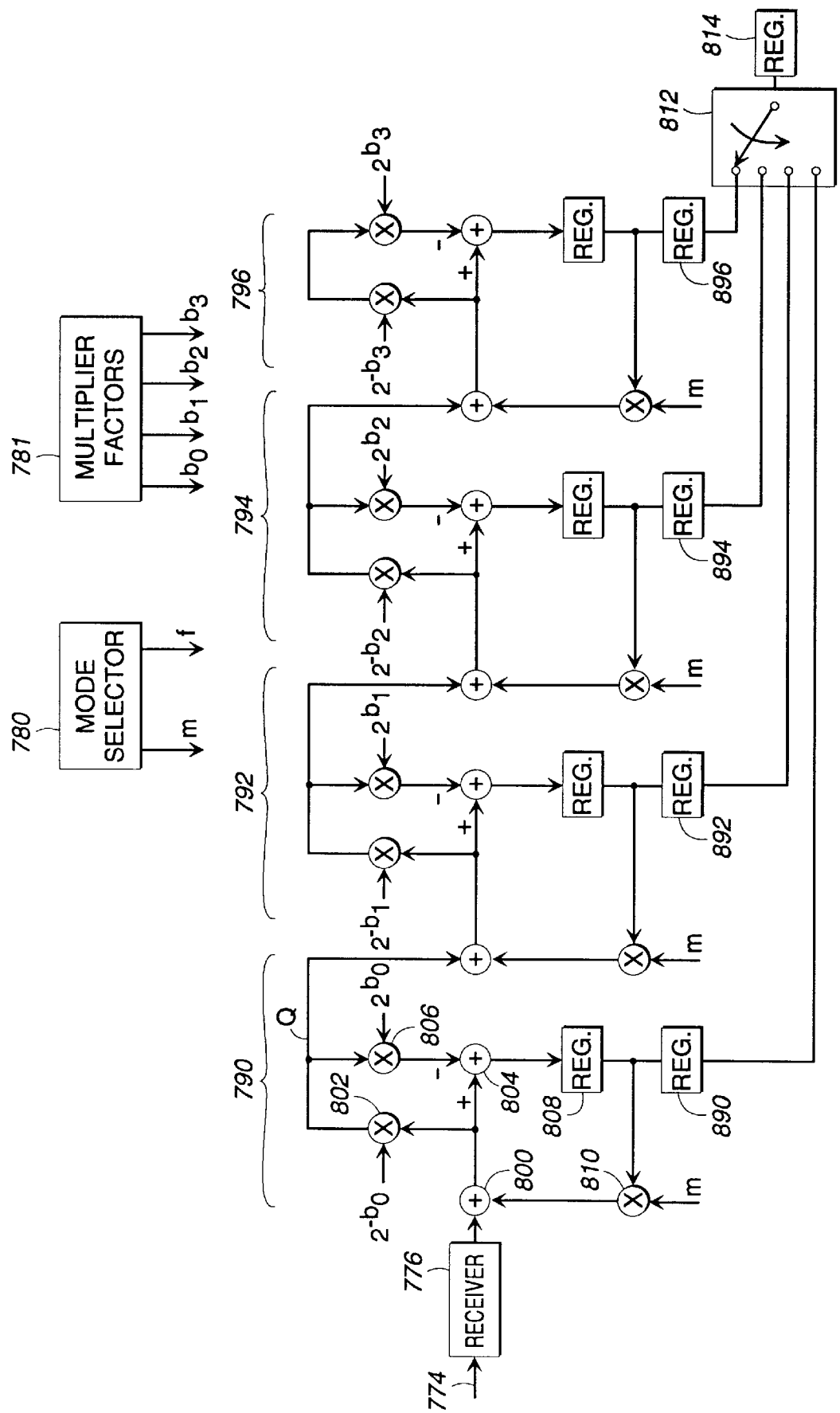
FIG. 18 shows a block diagram for a decoder matching the encoder of FIG. 17.

At the receiver end, as shown in FIG. 18, signals from communication channel 774 are converted back into remainders or fractionally encoded words by receiver circuitry 776. Receiver 776 comprises the circuitry of FIG. 10, except that de-mapper 230 receives the modulus m from mode selector 780. De-mapper 230 decodes the received symbol or signal points using a constellation of m points. Mode selector 780 generates the parameters m and f in a manner identical to mode selector 718. Multipliers b0, b1, b2, b3 and their inverses are stored in a register 781. Alternatively, the inverses of these parameters are calculated as described more fully above. Again, the number of remainder circuits is equal to the number of words per frame f. The remainder circuits are used to convert the fractionally encoded words into standard binary words. In remainder circuit 790, the bits obtained from de-mapping the first received symbol, which encoded the first fractionally encoded word from a given frame, are fed to adder 800. The output of adder 800 is fed to multiplier 802 and another adder 804. Multiplier 802 divides its input by $2^{b0}$ to generate a truncated integer Q described above. The integer Q is fed into a second multiplier 806 which multiplies by $2^{b0}$. The output is subtracted from the output of adder 800 by adder 804 to generate a first remainder. This first remainder is stored in register 808. The quotient Q is processed by the next remainder circuit 792.

In the next symbol period, multiplier 810 multiplies the output remainder in register 808 by m and the product is added by adder 800 to the bits obtained from de-mapping the next symbol, which represented the next fractionally encoded word of the frame. The whole process is then repeated. At the end of the frame, the buffer registers of the remainder circuits 790, 792, 794, 796 contain the remainders which are saved in buffer register 890, 892, 894, 896 and multiplexed by a switch 812, starting with the output of the last remainder circuit 896. The binary signals from switch 812 are then fed to a register 814 for further processing.

Operation of the receiver remainder circuits is identical to the transmitter except the multiplier coefficients are changed. These coefficients are generally pre-computed. The inverse, for example, depends on the register size used in the converter. For 16 bit registers the inverse is computed as 65536/m or (1/m) (216). The division is then accomplished by keeping only the most significant 15 bits of the 31 bit product of two 16 bit 2's compliment numbers. This is effectively a right shift of 16 bits or division by 65536. Note than $2^{-16} = 1/65536$.

In the receiver, the remainder circuits are restoring the original binary words with integer numbers of bits as they were received in register 712 at the transmitter. Thus, the multipliers $2^{-bi}$ and $2^{bi}$ in the receiver can be accomplished by shift operations.

Table II illustrates typical coefficients for 3200 symbols/sec using 16 bit registers selected in accordance with the principles set forth above.

TABLE II

EXAMPLE OF PRE-COMPUTED COEFFICIENTS FOR ALL DATA RATES AT 3200 SYMBOLS/SEC USING 16 BIT REGISTERS

| Data Rate | C | m | 1/m | $2^{b3}$ | $2^{-b3}$ | $2^{b2}$ | $2^{-b2}$ | $2^{b1}$ | $2^{-b1}$ | $2^{b0}$ | $2^{-b0}$ |
|---|---|---|---|---|---|---|---|---|---|---|---|
| 24000 | 15/2 | 182 | 360 | 256 | 256 | 128 | 512 | 256 | 256 | 128 | 512 |
| 21600 | 27/4 | 108 | 606 | 128 | 512 | 128 | 512 | 128 | 512 | 64 | 1024 |
| 19200 | 6 | 64 | 1024 | 64 | 1024 | 64 | 1024 | 64 | 1024 | 64 | 1024 |

TABLE II-continued

EXAMPLE OF PRE-COMPUTED COEFFICIENTS FOR
ALL DATA RATES AT 3200 SYMBOLS/SEC USING 16 BIT REGISTERS

| Data Rate | C | m | 1/m | $2^{b3}$ | $2^{-b3}$ | $2^{b2}$ | $2^{-2b}$ | $2^{b1}$ | $2^{-b1}$ | $2^{b0}$ | $2^{-b0}$ |
|---|---|---|---|---|---|---|---|---|---|---|---|
| 16800 | 21/4 | 39 | 1680 | 64 | 1024 | 32 | 2048 | 32 | 2048 | 32 | 2048 |
| 14400 | 9/2 | 23 | 2840 | 32 | 2048 | 16 | 4096 | 32 | 2048 | 16 | 4096 |
| 12000 | 15/4 | 14 | 4681 | 16 | 4096 | 16 | 4096 | 16 | 4096 | 8 | 8192 |
| 9600 | 3 | 8 | 8192 | 8 | 8192 | 8 | 8192 | 8 | 8192 | 8 | 8192 |
| 7200 | 9/4 | 5 | 13107 | 8 | 8192 | 4 | 16384 | 4 | 16384 | 4 | 16384 | m = smallest integer $\geq 2^c$
1/m = $2^{16}$/m

It should be understood that the apparatus may be implemented by using a microprocessor rather than using discrete components, for example by using a software program written in C.

Modulos converting is one of many techniques available to accomplish simultaneous analog and digital communication using fractional rate encoding. Any of the well known techniques to produce a fractionally encoded data signal may be used to produce the data signal that is added to the analog signal. For example, it is also possible to perform fractional rate encoding by switching constellations. For example, to achieve 4800 bits per second with 3000 symbols per second (1.6 bits per symbol), an 8 bit frame is partitioned into 3 words containing 2 bits each and 2 words containing 1 bit each. The 3 words with 2 bits are transmitted using a 4 symbol constellation, and the 2 words with 1 bit are transmitted using a 2 symbol constellation. This results in a total of 8 bits being transmitted using 5 symbols to achieve 1.6 bits per symbol. A desired fractional encoding may be achieved using constellations of any size and/or combinations of two or more symbol constellations. This technique offers the advantage of fractional rate encoding while using constellations that have square decision regions.

Other techniques for fractional rate encoding may be used. These techniques are well known in the art and include techniques such as the multidimensional signaling scheme disclosed in U.S. Pat. No. 5,115,453, and the shell mapping scheme, the radix mapping scheme and the half bit signaling scheme disclosed in CCITT V.fast modem standard recommendations D196, D115 and D143, respectively.

We claim:

1. A communication method comprising the steps of:
   mapping data bits into a symbol constellation having a plurality of symbols to produce a data signal, each of said plurality of symbols representing a noninteger number of said data bits;
   adding a second analog signal to said data signal to form a combined signal; and
   transmitting said combined signal.

2. The method of claim 1, wherein said step of transmitting comprises modulating said combined signal using QAM.

3. The method of claim 1, further comprising the step of encoding an input signal to produce said second signal, said second signal having two dimensions.

4. A communication method comprising the steps of:
   encoding binary data having binary bits, to produce fractionally encoded words,
   mapping said fractionally encoded words into a symbol constellation to produce a data signal;
   adding a second signal to said data signal to form a combined signal; and
   transmitting said combined signal.

5. The method of claim 4 wherein said step of encoding comprises using a modulus m converter to produce said fractionally encoded words, where m is the nearest integer larger than $2^c$ and c is a noninteger.

6. The method of claim 5, wherein said step of transmitting comprises modulating said combined signal using QAM.

7. The method of claim 5, wherein said step of mapping comprises mapping said fractionally encoded words into said symbol constellation having at least m symbols.

8. The method of claim 5, further comprising the step of encoding an input signal to produce said second signal, said second signal having two dimensions.

9. The method of claim 5, wherein said step of encoding binary data comprises partitioning said binary data into sequential frames, each frame having a predetermined number of said binary bits.

10. The method of claim 9, wherein said step of encoding binary data comprises partitioning said frames into words, at least two words within each of said frames having an unequal number of said binary bits.

11. The method of claim 10, wherein said step of encoding binary data comprises dividing each of said words in sequence by a modulus to generate fractionally encoded words.

12. A system for transmitting data, comprising:
   a means for mapping a number of data bits a first symbol constellation having a first number of symbols to produce a first data signal;
   a means for mapping an analog signal into a second symbol constellation having a second number of symbols to produce a second data signal;
   a means for adding said first data signal to said second data signal to form a combined signal; and
   a means for transmitting said combined signal.

13. The system defined in claim 12, wherein said means for transmitting said combined signal is further comprised of a means for modulating said combined signal using quadrature amplitude modulation (QAM).

14. The system defined in claim 12, further comprising:
   a means for encoding said data bits to produce said first data signal, said first data signal having two dimensions.

15. The system defined in claim 12, further comprising:
   a means for encoding said analog signal to produce said second data signal, said second data signal having two dimensions.

* * * * *

UNITED STATES PATENT AND TRADEMARK OFFICE
CERTIFICATE OF CORRECTION

PATENT NO. : 5,859,877
DATED : January 12, 1999
INVENTOR(S) : William Lewis Betts et al.

It is certified that error appears in the above-identified patent and that said Letters Patent is hereby corrected as shown below:

Column 15, line 62, after "bits", delete ",".

Column 15, line 63, after "words", delete "," and replace with -- ; --.

Column 16, line 17, after "4" insert -- , --.

Column 16, line 44, after "bits" insert -- into --.

Signed and Sealed this

Fifteenth Day of June, 1999

Attest:

Q. TODD DICKINSON

Attesting Officer

Acting Commissioner of Patents and Trademarks